United States Patent [19]
Asano et al.

[11] Patent Number: 5,718,988
[45] Date of Patent: Feb. 17, 1998

[54] ALKALINE STORAGE BATTERY

[75] Inventors: Shuji Asano; Yasutaka Noguchi, both of Kamakura; Ryoji Tsuboi, Chigasaki, all of Japan

[73] Assignee: Matsushita Electric Industrial Co., Ltd., Osaka-Fu, Japan

[21] Appl. No.: 755,855

[22] Filed: Dec. 2, 1996

[30] Foreign Application Priority Data

Apr. 3, 1996 [JP] Japan ................... 8-081273

[51] Int. Cl.⁶ .................. H01M 4/32; H01M 10/30
[52] U.S. Cl. ........................... 429/206; 429/223
[58] Field of Search ...................... 429/223, 209, 429/206, 218

[56] References Cited

U.S. PATENT DOCUMENTS

| | | | |
|---|---|---|---|
| 5,045,415 | 9/1991 | Witehira | 429/209 X |
| 5,100,748 | 3/1992 | Doniat et al. | 429/223 |
| 5,405,714 | 4/1995 | Terasaka et al. | 429/223 X |
| 5,434,019 | 7/1995 | Zhang et al. | 429/223 X |
| 5,554,460 | 9/1996 | Wu et al. | 429/223 X |

FOREIGN PATENT DOCUMENTS

| | | |
|---|---|---|
| 59-027457 A | 2/1984 | Japan . |
| 62-071168 A | 4/1987 | Japan . |

*Primary Examiner*—Anthony Skapars
*Attorney, Agent, or Firm*—Panitch Schwarze Jacobs & Nadel, P.C.

[57] ABSTRACT

An alkaline storage battery configured with an improved nickel positive electrode plate having a high capacity density and a high utilization of the active material is disclosed. The nickel positive electrode plate comprises a porous metal plaque, a first layer of nickel hydroxide loaded in close proximity to inner surfaces of pores of the porous metal plaque, and a second layer of nickel hydroxide loaded over the first layer. The nickel hydroxide in the second layer has a larger particle diameter than that in the first layer, and the amount of the nickel hydroxide in the second layer occupies a majority of the total amount of the active material filled in the positive electrode.

9 Claims, 4 Drawing Sheets

ALKALINE STORAGE BATTERY

BACKGROUND OF THE INVENTION

1. Field of the Invention

The present invention relates to alkaline storage batteries such as nickel-cadmium storage battery, nickel-metal hydride storage battery and the like, particularly to an improvement in the positive electrode plate for these storage batteries.

2. Description of the Prior Art

The following processes are known methods for manufacturing the nickel positive electrodes for alkaline storage batteries:

1) Electrochemical process of precipitating nickel hydroxide in pores of a porous sintered plaque by negatively polarizing the porous sintered plaque in an aqueous solution of a nickel salt; 2) Chemical process of impregnating a porous sintered plaque with an aqueous solution of a nickel salt, then drying the impregnated plaque, and subsequently converting the nickel salt to nickel hydroxide by immersing the dried plaque in an aqueous alkaline solution; 3) Thermal process of impregnating a porous sintered plaque with an aqueous solution of a nickel salt, then drying the impregnated plaque, and subsequently converting the nickel salt to nickel hydroxide by heat treatment.

For realizing a high utilization of the active material and producing a positive electrode plate having a high capacity density, a combination of the nickel hydroxide having a large particle diameter and that having a small particle diameter, wherein the amount of the nickel hydroxide having the small particle diameter occupies a majority of the total amount of the active material, has been applied as the active material to be loaded in the pores of the porous plaque.

When the nickel-cadmium storage batteries and nickel-metal hydride storage batteries configured with such a nickel positive electrode plate are subjected to repeated charge and discharge cycles with a suitable current at room temperature, the nickel positive electrode plate works well without any problem.

Recently, applications of the batteries have been widened remarkably and the size of the appliances using the batteries as their power sources have been made small accordingly. In such applications as backup batteries for a solar power-generating system or batteries for driving the appliances installed outdoor, for instance, the batteries are required to have a high reliability even in an operation at a high temperature, i.e., a long cycle life, in addition to the high capacity density. As a result of a durability performance test conducted on the above-mentioned battery, it was found that the capacity decreased at an early stage of the test, and thus the battery did not have a satisfactory reliability and cycle life in an operation at a high temperature. This is due to the fact that the electrolyte does not sufficiently reach innermost parts of the pores of the electrode plate at the nickel positive electrode side, which causes starved electrolyte in the innermost parts, thereby to increase the polarization at the positive electrode side.

Separate from this, there is a demand for batteries having a smaller size and a high capacity density with the progress of miniaturization of the appliances employing the alkaline storage batteries as their power sources- In order to cope with this requirement, a method is proposed for improving the utilization of the active material and the discharge potential characteristic of a battery configured with this active material (Japanese Patent Publication No. Hei 6-77452). The disclosed method belongs to the chemical process of impregnating the plaque with an aqueous solution of a nickel salt and subsequently converting the nickel salt to nickel hydroxide by an alkali treatment, thereby to load the nickel hydroxide in the pores of the plaque. The method further includes a process of forming a layer consisting mainly of cobalt hydroxide or a cobalt salt between the two nickel hydroxide layers both formed by the chemical process in a sandwiched structure.

In the last process of the proposed method, the preparation of the nickel hydroxide which forms the two layers is essentially based on the chemical process that limits the filling amount of the active material into the pores of the plaque and thus it is difficult to produce an electrode plate having a sufficiently high capacity density. Another problem is that a large particle diameter of the loaded active material makes the utilization of the active material lower than that of the nickel hydroxide obtained by the electrochemical process. As described previously, the proposed method is difficult to secure an acceptable conductive property of the active material and to maintain the discharge capacity over a certain value for a long period of time.

SUMMARY OF THE INVENTION

The primary object of the present invention is to solve the above-mentioned problems.

The present invention provides an alkaline storage battery comprising a nickel positive electrode plate, a negative electrode plate, a separator and an alkaline electrolyte. The above-mentioned nickel positive electrode plate comprises a porous metal plaque, a first layer of nickel hydroxide loaded in close proximity to inner surfaces of pores of the above-mentioned porous metal plaque and a second layer of nickel hydroxide loaded over the first layer; the nickel hydroxide in the second layer has a larger particle diameter than that in the first layer, and the nickel hydroxide in the second layer occupies a majority of the total amount of the active material filled in the positive electrode.

In a preferred mode of the present invention, the above-mentioned nickel positive electrode plate comprises the porous metal plaque of a sintered body consisting mainly of nickel and containing cobalt, the first layer of nickel hydroxide loaded in close proximity to the inner surfaces of the pores of the above-mentioned porous metal plaque, and the second layer of nickel hydroxide loaded over the first layer, wherein the nickel hydroxide in the first layer has been deposited by an electrochemical process and the nickel hydroxide in the second layer has been deposited by a chemical process, and wherein the nickel hydroxide deposited by the chemical process occupies a majority of the total amount of the active material filled in the positive electrode.

In another preferred mode of the present invention, cobalt hydroxide is present between the first layer of nickel hydroxide of small particle diameter and the second layer of nickel hydroxide of large particle diameter.

In still another preferred mode of the present invention, a small amount of particles of cobalt hydroxide are present in the second layer of nickel hydroxide of large particle diameter in a mixed state.

In a further preferred mode of the present invention, a small amount of particles of cobalt hydroxide are present in the first layer of nickel hydroxide of small particle diameter in a mixed state.

It is preferable that the nickel hydroxide of small particle diameter loaded by the electrochemical process is about 30% by weight and the nickel hydroxide of large particle diameter loaded by the chemical process is about 70% by weight of the total amount of the active material filled in the positive electrode.

While novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
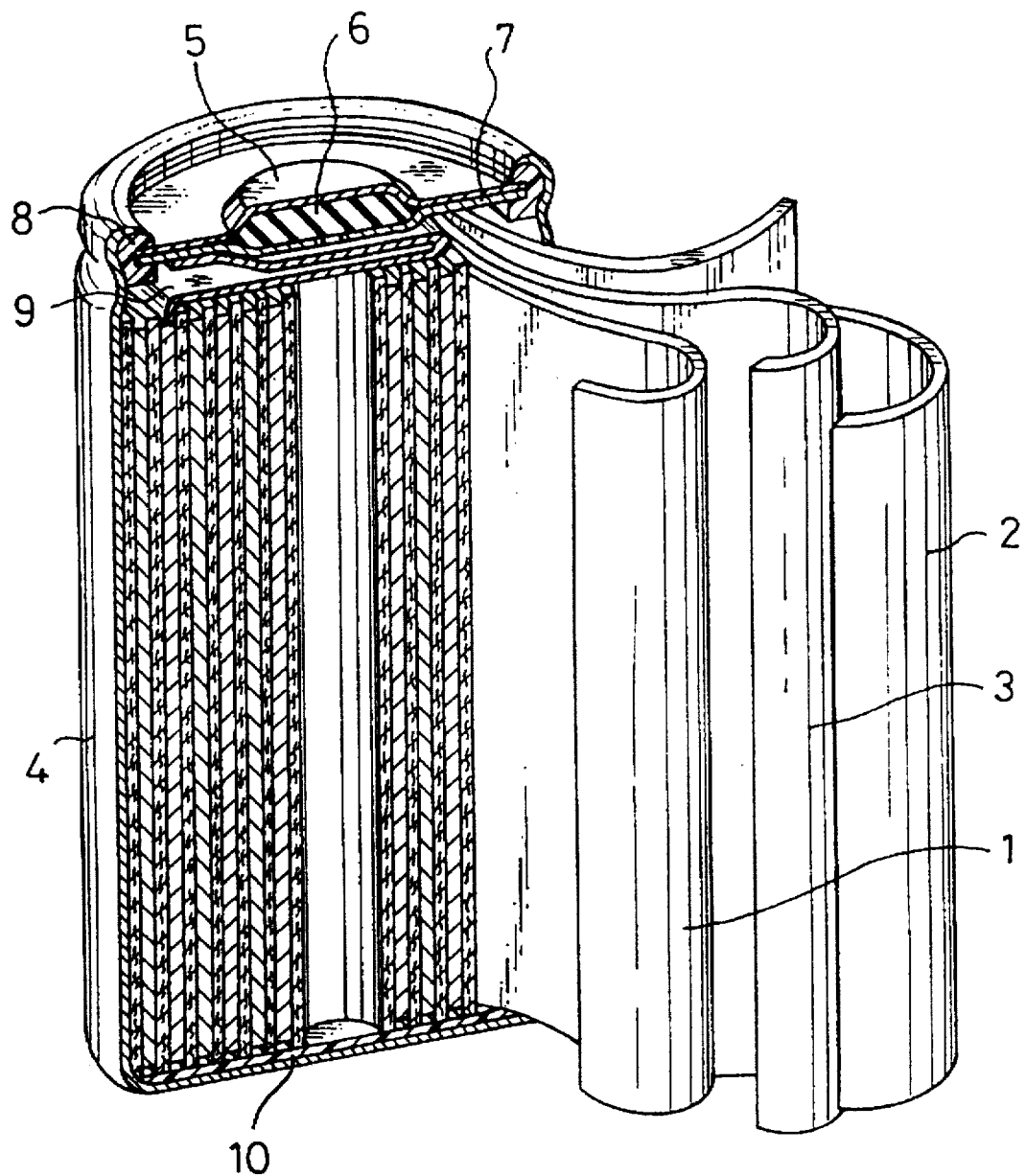
FIG. 1 is a partly cut-out perspective view showing a storage battery in accordance with an embodiment of the present invention.

The alkaline storage battery in accordance with the present invention comprises a nickel positive electrode plate, a negative electrode plate, a separator and an alkaline electrolyte. In the alkaline storage battery, the above-mentioned nickel positive electrode plate comprises a porous metal plaque, a first layer of nickel hydroxide loaded in close proximity to the inner surfaces of the pores of the above-mentioned porous metal plaque and a second layer of nickel hydroxide loaded over the first layer, wherein the nickel hydroxide in the first layer has been deposited by an electrochemical process and the nickel hydroxide in the second layer has been deposited by a chemical process, and wherein the amount of the nickel hydroxide deposited by the chemical process occupies a majority of the total amount of the active material filled in the positive electrode.

The present invention is also directed to a method for manufacturing a nickel positive electrode for an alkaline storage battery comprising:

a first active material loading step wherein pores of a porous metal plaque are filled with an aqueous solution of nickel nitrate having a nitric acid-acidity and subsequently the above-mentioned nickel nitrate is converted to nickel hydroxide by an electrochemical process, wherein the above-mentioned porous metal plaque is negatively polarized, and a second active material loading step wherein the pores of the above-mentioned porous metal plaque are impregnated with an aqueous solution of a nickel salt and subsequently the nickel salt is converted to nickel hydroxide by a chemical process which includes an alkali treatment, wherein the nickel hydroxide filled by the second active material loading step occupies a majority of the total amount of the active material filled in the positive electrode.

By the first active material loading step, the pores of the porous metal plaque are loaded with nickel hydroxide having a small particle diameter, preferably of about 2–8 μm, in close proximity to the inner surfaces of the pores. By the second active material loading step, nickel hydroxide having a large particle diameter, preferably of about 8–20 μm is loaded over the above-mentioned nickel hydroxide of small particle diameter. As a result, the nickel hydroxide of small particle diameter which has been loaded in close contact with the pores of the plaque becomes less in volume and thickness, whereas the nickel hydroxide of large particle diameter which has been loaded over the nickel hydroxide of small particle diameter become greater in volume and thickness.

By the above-mentioned 2-step loading operation, suitable gaps are formed between the neighboring particles of the nickel hydroxide of large particle diameter placed at surface sides of the electrode plate and the electrolyte readily permeates through the gaps. This improves the transport and dispersion of the electrolyte into the innermost parts of the pores of the plaque. Therefore, it is possible to solve the long standing problems that the amount of the electrolyte is inherently small and that the electrolyte hardly reaches the active material loaded in the innermost parts of the pores of the plaque. In this manner, the present invention provides an alkaline storage battery having a high capacity density, a high utilization of the active material, a high reliability in an operation at a high temperature, and a long cycle life.

By performing a step between the above-mentioned two loading steps, wherein the pores of the above-mentioned porous metal plaque are impregnated with an aqueous solution of a cobalt salt and subsequently the cobalt salt is converted to cobalt hydroxide by an alkali treatment, it is possible to realize a structure wherein the cobalt hydroxide is present between the layer of the nickel hydroxide of small particle diameter and the layer of the nickel hydroxide of large particle diameter. According to this specific method, since the aqueous solution of the cobalt salt can permeate particularly through the layer of the nickel hydroxide of small particle diameter, it is possible to allow coexistence of the cobalt hydroxide in the layer of the nickel hydroxide of small particle diameter.

In addition, by including a small amount of a cobalt salt in the aqueous solution of nickel salt employed in the second active material loading step, it is possible to include the cobalt hydroxide in the layer of the nickel hydroxide having large particle diameter to be loaded in the pores of the above-mentioned porous metal plaque in a mixed state. Since the above-mentioned method converts the nickel salt and the cobalt salt to the corresponding hydroxides at the same time, it is possible to form a nickel hydroxide which contains cobalt in a solid solution.

By allowing the cobalt hydroxide to exist in a mixed state as described previously, it is possible to form conductive networks among the neighboring particles of the active material and between the particles of the active material and the plaque, thereby to increase the conductive property of the electrode plate as a whole.

As described previously, according to the present invention wherein the nickel hydroxide obtained by the electrochemical process is loaded in the pores as a part of the active material, it is possible, by also utilizing its high loading density, to produce a nickel positive electrode plate having a high capacity density, a high utilization of the active material and a long cycle life.

In the following paragraphs, the present invention will be described in more detail by referring to its specific examples and comparative examples.

EXAMPLE 1

A sintered nickel plaque having a porosity of 80% was first loaded with nickel hydroxide having a small particle diameter (average particle diameter: 6 μm) by the electrochemical process. In a state of the above-mentioned plaque being immersed in an aqueous solution of 3.5 mol/L nickel nitrate of pH 2.0 at 80° C., an electrolysis was performed by employing this plaque as the cathode and a metal nickel plate as the anode, thereby to load the nickel hydroxide in the pores of the plaque. The loaded plaque was then immersed in an aqueous solution of sodium hydroxide followed by washing with water. The amount of the nickel hydroxide loaded in this process was about 20% by weight of the total amount of the required active material.

Thereafter, the above-mentioned plaque loaded with the nickel hydroxide of small diameter was dried and subsequently loaded with nickel hydroxide having a large particle diameter (average particle diameter: 15 μm). That is, after the above-mentioned dried plaque was immersed in an aqueous solution of 3.0 mol/L nickel nitrate of pH 1.5 at 80° C. and dried again, the nickel nitrate impregnated in the plaque was converted to nickel hydroxide by immersing the dried plaque in an aqueous solution of 4.0 mol/L sodium hydroxide at 60° C., followed by drying and washing with water. By repeating this series of the steps comprising immersion in the nickel salt solution, immersion in the alkali solution and washing with water several times, remaining about 80% by weight of the required active material, i.e., the balance of the total amount was loaded.

The plaque loaded with the active material was cut to a rectangular of 35×150 mm to prepare a nickel positive electrode plate in accordance with the present invention. By combining this positive electrode plate with a known paste type cadmium negative electrode plate, a belt-type separator made of polypropylene nonwoven fabric and an electrolyte of aqueous sodium hydroxide solution having a specific gravity of 1.20, a 4/5A size (corresponding to IEC KR17/43) sealed nickel-cadmium storage battery A having a nominal capacity of 700 mAh was produced as shown in FIG. 1.

The structure of the sealed nickel-cadmium storage battery shown in FIG. 1 is described below. A combination of a nickel positive electrode plate 1 with a cadmium negative electrode plate 2 and a separator 3 placed between both electrodes is rolled up in a spiral fashion and the rolled-up electrode assembly is housed in a battery casing 4. After the electrolyte is injected into the battery casing 4, a top open end of the battery casing 4 is closed with a sealing disc 7 which also serves as a positive electrode terminal 5 and is provided with a safety valve 6 at its central valve chamber and an insulating annular gasket 8 encircling the periphery of the sealing disc 7. In this figure, numeral 9 designates a lead conductor for connecting the upper end of the rolled-up positive electrode plate 1 to the sealing disc 7. The negative electrode plate 2 is connected to the battery casing 4 with another lead conductor (not shown). Numeral 10 designates an insulator disk placed on the inside bottom of the battery casing 4.

COMPARATIVE EXAMPLE 1

After the plaque was loaded with the nickel hydroxide of small particle diameter in an amount corresponding to about 80% by weight of the total amount of the required active material by the electrochemical process as in Example 1, the loaded plaque was immersed in an aqueous solution of nickel nitrate and then in an aqueous solution of sodium hydroxide, thereby to load the nickel hydroxide of large particle diameter in an amount corresponding to the balance, i.e., about 20% by weight, which gave another positive electrode plate. Another sealed nickel-cadmium storage battery was produced with a similar structure to that of the battery A except for the use of this positive electrode plate. This was named battery B.

Figure 2:
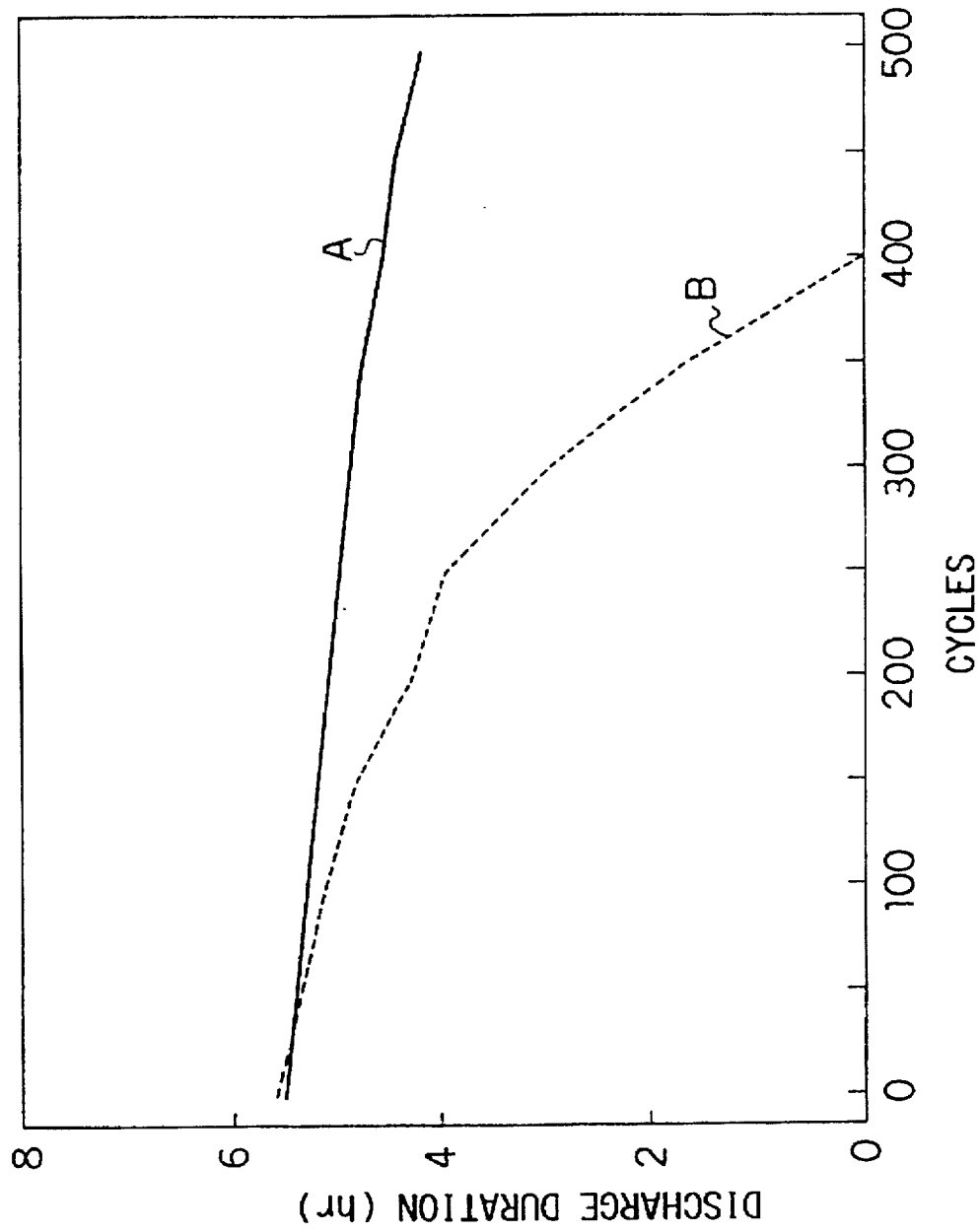
FIG. 2 is a diagram showing the relationships between the charge/discharge cycle numbers and the discharge durations of the battery in accordance with the embodiment of the present invention and of that in accordance with a comparative example.
Figure 3:
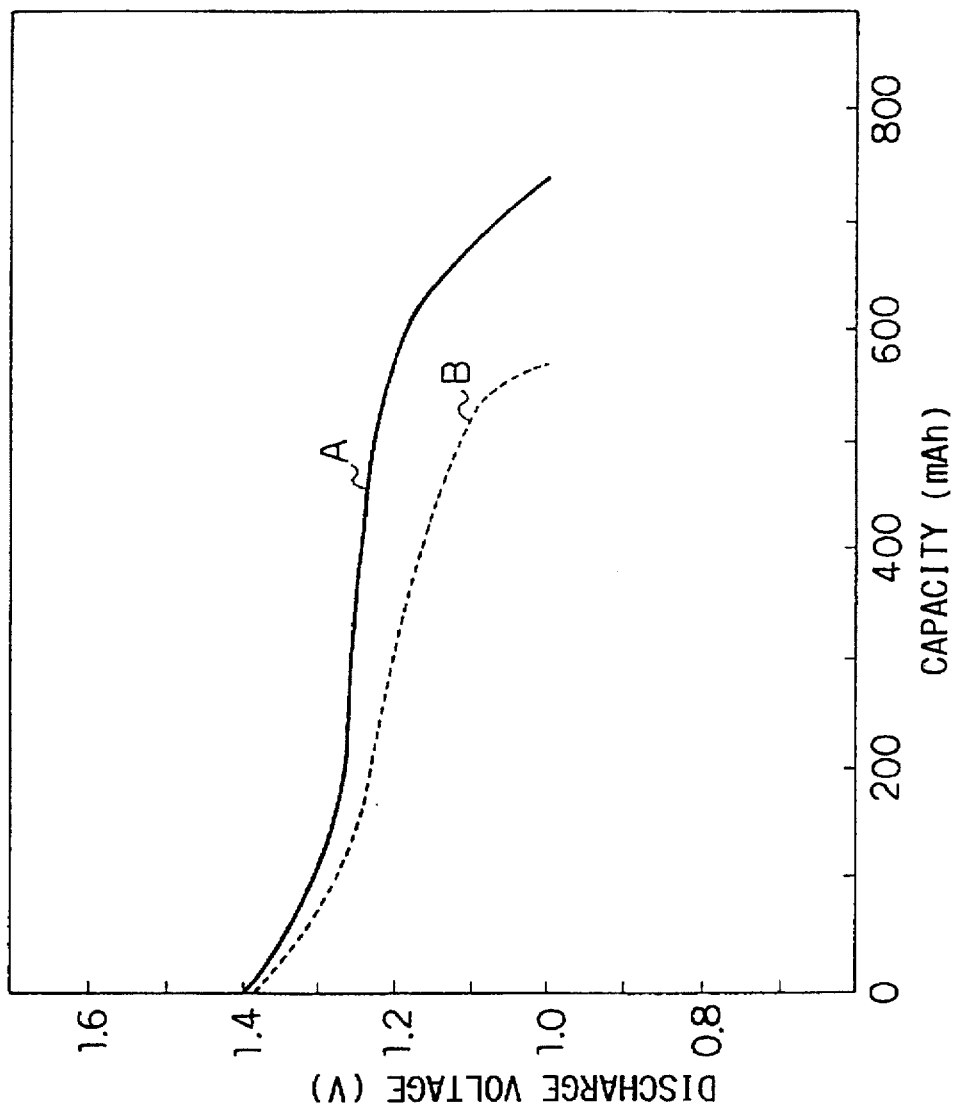
FIG. 3 is a diagram showing the discharge voltage curves of the battery in accordance with the embodiment of the present invention and of that in accordance with a comparative example.

The batteries A and B were subjected to cycle durability tests in conformity with 7, 3, 9 of JIS C 8705. First, the discharge capacities of the batteries A and B were confirmed by charging them at 0.1 C at an ambient temperature of 20° C. for 16 hours and discharging them at 0.2 C until the terminal voltages decreased to 1.0 V. Next, under the condition of ambient temperature of 50° C., the batteries A and B were charged at 0.1 C for 16 hours, followed by discharging at 0.25 C for 2 hours and 20 minutes, and then subjected to a repetition of charge/discharge cycles wherein they were charged at 0.1 C for 3 hours and 10 minutes, followed by discharging at 0.25 C for 2 hours and 20 minutes. During the repetition of the charge/discharge cycles, discharge durations were derived by charging them at 0.1 C for 16 hours and then discharging them at 0.2 C until the terminal voltage decreased to 1.0 V for every 50 cycles. FIG. 2 shows the relationships between the charge/discharge cycle numbers and the discharge durations. And, FIG. 3 shows the discharge voltage curves of the batteries at the 200th cycle.

The battery A configured with the positive electrode of example 1 which permits favorable permeation or dispersion of the electrolyte into the innermost parts of the active material loaded in the pores of the plaque has a favorable characteristic, whereas in the battery B configured with the positive electrode of comparative example 1 unsatisfactory permeation or dispersion of the electrolyte into the innermost parts of the active material loaded in the pores of the plaque, the battery performance is apparently deteriorated at an early stage of the cycles. The discharge voltage curve in the diagram of FIG. 3 indicates a large drop at the initial stage and intermediate stage of discharging in the battery B. It is believed that the voltage drop in the battery B is due to the fact that the dispersion of the electrolyte in the electrode plate is too insufficient to reduce a resistance of the electrode reaction and thus the electric power consumed in the reaction is made greater accordingly.

EXAMPLE 2

Next, a description will be made on an example with improved conductive property of the electrode plate with cobalt hydroxide.

First, a paste was prepared by mixing a nickel carbonyl powder with a cobalt oxide powder in a weight ratio of 90:10 and sufficiently kneading the obtained mixture with an ethylene glycol solution dissolving methyl cellulose. After coating this paste on both faces of a nickel-plated perforated steel plate and dried, the dried plate was sintered at 1,000° C. to produce a sintered nickel plaque having a porosity of about 80%.

Separate from this, an aqueous solution of 3.5 mol/L nickel nitrate of pH 2.0 was prepared as the electrolyte for the electrochemical process. An electrolysis was performed at an electrolyte temperature of 80° C. by immersing the above-mentioned plaque as the cathode and employing a metallic nickel plate as the anode. The plaque was then immersed in an aqueous solution of sodium hydroxide, followed by washing with water and drying. The amount of the nickel hydroxide loaded by this electrochemical process was about 30% by weight of the total amount of the required active material. Thereafter, the dried plaque was impregnated with cobalt nitrate by immersing the plaque in an aqueous solution of 3.0 mol/L cobalt nitrate of pH 1.5 at 80° C. and dried again. The impregnated plaque was then immersed in an aqueous solution of 4.0 mol/L sodium hydroxide at 60° C. to convert the cobalt nitrate to cobalt hydroxide, and washed with water.

Subsequently, the above-mentioned plaque was immersed in an aqueous solution at 80° C. obtained by mixing 3.0 mol/L nickel nitrate solution with 0.05 mol/L cobalt nitrate solution at a volumetric ratio of 1:1, followed by drying. The nickel nitrate and the cobalt nitrate loaded in the plaque were then converted to nickel hydroxide and cobalt hydroxide, respectively, by immersing the plaque in an aqueous solution of 4.0 mol/L sodium hydroxide at 60° C., followed by washing with water.

By repeating this series of the steps comprising immersion in the mixed solution of the nickel salt and the cobalt salt, immersion in the alkali solution and washing with water several times, remaining about 70% by weight of the nickel hydroxide of the required active material, i.e., the balance of the total amount was loaded.

By cutting the plaque loaded with the active material to a rectangular of 35×150 mm, a nickel positive electrode plate in accordance with the present invention was produced. By combining this positive electrode with a known paste type cadmium negative electrode plate and a separator made of polypropylene nonwoven fabric as described previously, another 4/5A size sealed nickel-cadmium storage battery C having a nominal capacity of 700 mAh was produced.

COMPARATIVE EXAMPLE 2

By employing a sintered nickel plaque containing cobalt similar as in Example 2, the nickel hydroxide was loaded in an amount corresponding to 70% by weight of the total amount of the required active material by the electrochemical process. After loading, the plaque was immersed in a mixed aqueous solution of nickel nitrate and cobalt nitrate and dried. The nickel hydroxide was loaded in an amount corresponding to the balance, i.e., 30% by weight by immersing the plaque in an aqueous solution of sodium hydroxide. By employing the positive electrode plate produced in this manner, a 4/5A size sealed nickel-cadmium storage battery was configured as described in Example 1. This was named battery D.

COMPARATIVE EXAMPLE 3

By employing a sintered nickel plaque containing cobalt as in Example 2, the nickel hydroxide was loaded in an amount corresponding to about 60% by weight of the total amount of the required active material by the chemical process. After loading, the plaque was impregnated with cobalt nitrate and subjected to post-treatment, thereby to load cobalt hydroxide. Thereafter, the plaque was loaded with the nickel hydroxide in an amount corresponding to the balance, i.e., 40% by weight, by the same chemical process. By employing the positive electrode plate produced in this manner, a 4/5A size of sealed nickel-cadmium storage battery was configured as described in Example 1. This was named battery E.

COMPARATIVE EXAMPLE 4

A paste was prepared by mixing the nickel carbonyl powder with the ethylene glycol solution of methyl cellulose and kneading the mixture well. After coating this paste on both faces of a nickel-plated perforated steel plate and dried, the dried plate was sintered to produce a sintered nickel plaque.

The nickel hydroxide was loaded in this plaque in an amount corresponding to about 70% by weight of the total amount of the required active material by the electrochemical process as described previously. After loading, the plaque was impregnated with cobalt nitrate and subjected to post-treatment to load the plaque with cobalt hydroxide. Thereafter, the nickel hydroxide was loaded in an amount corresponding to the balance, i.e., 30% by weight by immersing the plaque in a mixed aqueous solution of nickel nitrate and cobalt nitrate and subsequently converting the nitrates to the corresponding hydroxides with an alkali. By employing the positive electrode plate produced in this manner, a 4/5A size of sealed nickel-cadmium storage battery was configured as in Example 1. This was named battery F.

Active material loading densities of the respective batteries C, D, E and F are listed in Table 1 below. In addition, the utilizations of the active materials are determined from the measurement results of the discharge capacities of the respective batteries at the second cycle after two cycles of charging at 0.1 C at a constant temperature of 50° C. for 15 hours and discharging at 0.2 C until the terminal voltages decreased to 1.0 V. The results are summarized in Table 1 below.

TABLE 1

| Battery | Loading Density (mAh/cc) | Utilization at the 2nd cycle (%) |
|---|---|---|
| C (Example 2) | 400 | 98.0 |
| D (Comparative Example 2) | 400 | 96.5 |
| E (Comparative Example 3) | 350 | 95.0 |
| F (Comparative Example 4) | 400 | 97.0 |

As apparent from Table 1, the battery C configured with the positive electrode which has the sintered nickel plaque containing cobalt and the layer of cobalt hydroxide sandwiched between the nickel hydroxide layer obtained by the electrochemical process and the nickel hydroxide layer obtained by the chemical process has a higher utilization of the active material than the battery D of the comparative example 2 which lacks the cobalt hydroxide layer between the nickel hydroxide layers. The reason for this is believed to be due to the fact that the cobalt hydroxide sandwiched between the nickel hydroxide layers disperses into peripheries of the respective particles of the nickel hydroxide obtained by the electrochemical process and of the nickel hydroxide obtained by the chemical process as cobaltate ions, and is converted to cobalt oxyhydroxide demonstrating a favorable conductive property during the charging operation, thereby to increase the utilization of the active material. The battery C also has a higher capacity density and a higher utilization of the active material than those of the battery E of the comparative example 3 which has the layer of cobalt hydroxide sandwiched between the layers of the nickel hydroxide both obtained by the chemical process. The reason for this is believed to be due to the fact that the nickel hydroxide obtained by the electrochemical process has a larger contact surface area as compared with the nickel hydroxide obtained by the chemical process, and thus an effect of forming the cobalt hydroxide on the surfaces of the nickel hydroxide particles is enlarged.

The battery C also has a higher utilization of the active material than that of the battery F of the comparative example 4 which contains no cobalt in the sintered nickel plaque. The reason for this is believed to be due to the fact that the existence of the cobalt in the plaque improved the conductive properties between the plaque and the layers of the active material particles loaded by the electrochemical process and by the chemical process, respectively. It is also believed that the conductive property is further improved by a synergetic effect of formation of the conductive networks extending throughout the electrode plate brought by the above-mentioned existence of the cobalt hydroxide, and by sandwiching the nickel hydroxide layer between the cobalt hydroxide and the cobalt contained in the sintered plaque, thereby to further increase the utilization of the active material.

Figure 4:
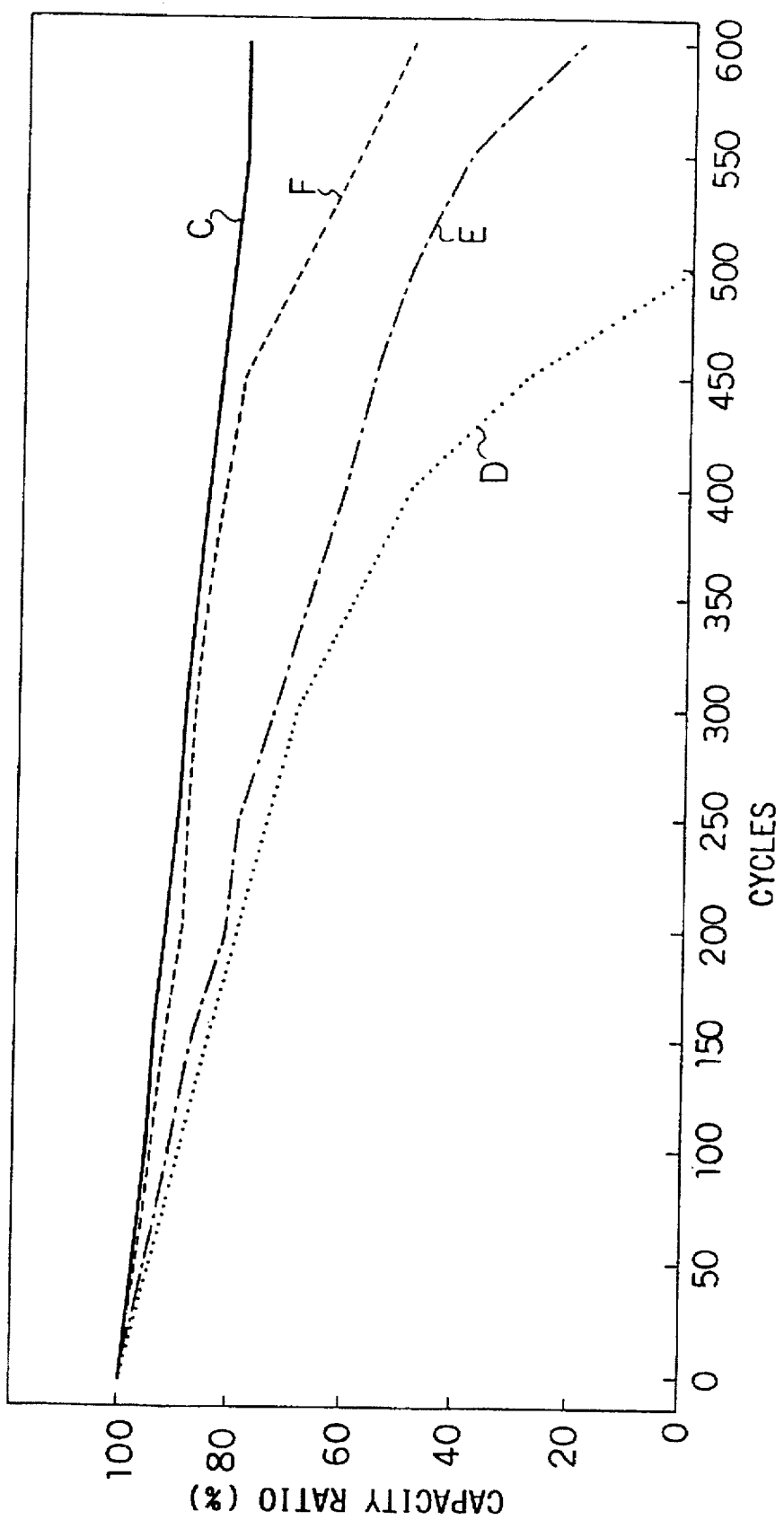
FIG. 4 is a diagram showing the relationships between the charge/discharge cycle numbers and the discharge capacity ratios at each cycle of batteries in accordance with another embodiment of the present invention and of those in accordance with the other comparative examples.

The batteries C, D, E and F were also subjected to cycle durability tests in conformity with 7, 3, 9 of JIS C 8705. FIG. 4 shows the relationships between the charge/discharge cycle numbers at an ambient temperature of 20° C. and the capacity ratios of the respective batteries (relative values if the capacity at the first cycle is defined as 100) at every cycle during the test.

As clear from this figure, the battery C having a high conductive property in the electrode plate demonstrates a favorable long-term performance. In the battery D, performance is deteriorated at an early stage of the cycles because of unsatisfactory conductive property among the neighboring nickel hydroxide particles. In the battery E which has secured a certain degree of conductive property among the neighboring nickel hydroxide particles by the existence of the cobalt hydroxide layer, the performance is deteriorated because of poor conductive property. The battery F, in which the conductive property has been secured at a considerable degree by the existence of the cobalt hydroxide layer among the neighboring nickel hydroxide particles but not favorable between the plaque and the nickel hydroxide particles still has an unsatisfactory conductive property for maintaining the battery performance further longer.

In the foregoing embodiments, although the mixed solution obtained by mixing the aqueous solution of the nickel salt with the aqueous solution of the cobalt salt has been used, a similar technical advantage dan be obtained by using only the aqueous solution of the nickel salt. Further, although the nitrate is used as the nickel salt, substantially the same technical advantage can also be achieved by the use of a sulfate.

In the foregoing embodiments, the average particle diameter of the nickel hydroxide to be loaded in close proximity to the inner surfaces of the pores of the plaque is adjusted to about 6 μm and the average particle diameter of the nickel hydroxide to be loaded over the layer of the first-mentioned nickel hydroxide is adjusted to about 15 μm, The particle diameter of the nickel hydroxide varies by the conditions how it is produced. In the electrochemical process, the particle diameter varies by the current density, the transferring speed of the plaque in the electrolyte, etc.

The particle diameter of the nickel hydroxide loaded in close proximity to the inner surfaces of the pores is preferably about 2–8 μm. In the chemical process, the particle diameter varies by the concentration of the nickel salt solution employed for impregnating the plaque, and the repetition times of the cycle starting from impregnation, alkali treatment, and washing with water. The preferable particle diameter of the nickel hydroxide to be loaded by the chemical process is in a range of 8–20 μm.

As described previously, according to the present invention, it is possible to favorably supply and disperse of the electrolyte to the active material particles loaded at the innermost parts of the pores of the plaque in the nickel positive electrode plate, thereby to cancel the starved state of the electrolyte at the innermost parts of the pores of the positive electrode plate which is liable to occur in an alkaline storage battery containing only a small amount of electrolyte. In addition, the present invention forms the conductive networks between the plaque and the active material particles and among the neighboring active material particles by an oxide or a hydroxide of cobalt included in the plaque or the active material, thereby to provide an alkaline storage battery having a high capacity density, a high active material utilization, a high reliability in an operation at a high temperature, and a long cycle life.

It is understood that various other modifications and alterations will be apparent to and can be readily made by those skilled in the art without departing from the true scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An alkaline storage battery comprising a nickel positive electrode plate, a negative electrode plate, a separator and an alkaline electrolyte, wherein said nickel positive electrode plate comprises:

a porous metal plaque, a first layer of nickel hydroxide loaded in close proximity to inner surfaces of pores of said porous metal plaque, and a second layer of nickel hydroxide loaded over the first layer, wherein the nickel hydroxide in the second layer has a larger particle diameter than that in the first layer, and wherein the amount of the nickel hydroxide in the second layer occupies a majority of the total amount of the active material loaded in the positive electrode.

2. The alkaline storage battery in accordance with claim 1, wherein cobalt hydroxide is present between the first and the second layers of nickel hydroxide.

3. The alkaline storage battery in accordance with claim 1, wherein a small amount of particles of cobalt hydroxide are present in the second layer of nickel hydroxide in a mixed state.

4. The alkaline storage battery in accordance with claim 1, wherein a small amount of particles of cobalt hydroxide are present in the first layer of nickel hydroxide in a mixed state.

5. The alkaline storage battery in accordance with claim 1, wherein said porous metal plaque is a sintered body comprising a metal core material and a nickel powder fixed to the core material.

6. An alkaline storage battery comprising a nickel positive electrode plate, a negative electrode plate, a separator and an alkaline electrolyte, wherein said nickel positive electrode plate comprises:

a porous metal plaque of a sintered body consisting mainly of nickel and containing cobalt, a first layer of nickel hydroxide loaded in close proximity to inner surfaces of pores of said porous metal plaque, and a second layer of nickel hydroxide loaded over the first layer, wherein the nickel hydroxide in the first layer is deposited by an electrochemical process and the nickel hydroxide in the second layer is deposited by a chemical process, and wherein the amount of the nickel hydroxide deposited by the chemical process occupies a majority of the total amount of the active material loaded in the positive electrode.

7. The alkaline storage battery in accordance with claim 6, wherein the nickel hydroxide deposited by the electrochemical process is about 30% by weight and the nickel hydroxide deposited by the chemical process is about 70% by weight of the total amount of the active material filled in the positive electrode.

8. The alkaline storage battery in accordance with claim 6, wherein a small amount of particles of cobalt hydroxide are present in the second layer of nickel hydroxide deposited by the chemical process in a mixed state.

9. The alkaline storage battery in accordance with claim 6, wherein the second layer of nickel hydroxide deposited by the chemical process includes a small amount of cobalt in a state of solid solution.

* * * * *